United States Patent Office 3,397,802
Patented Aug. 20, 1968

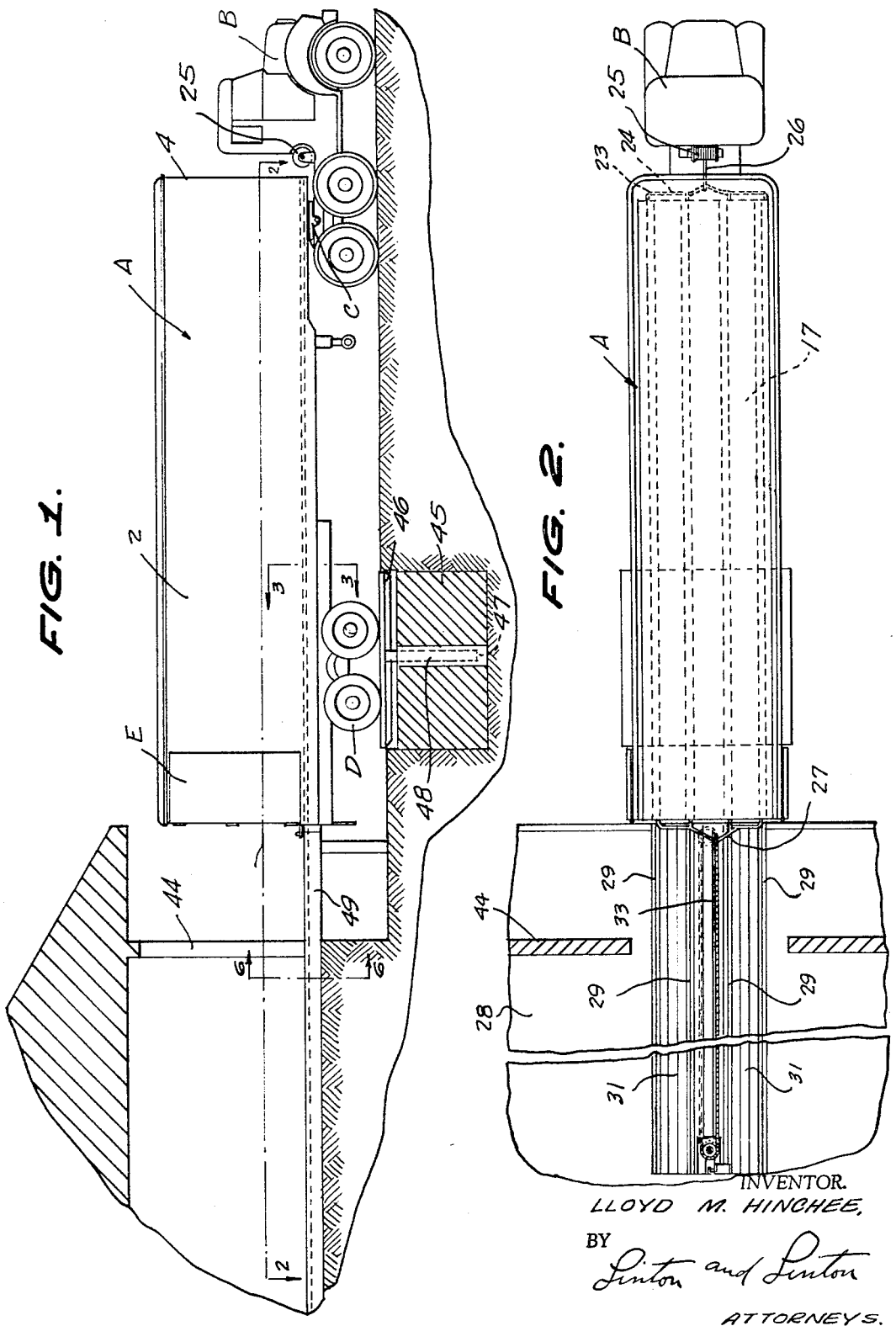

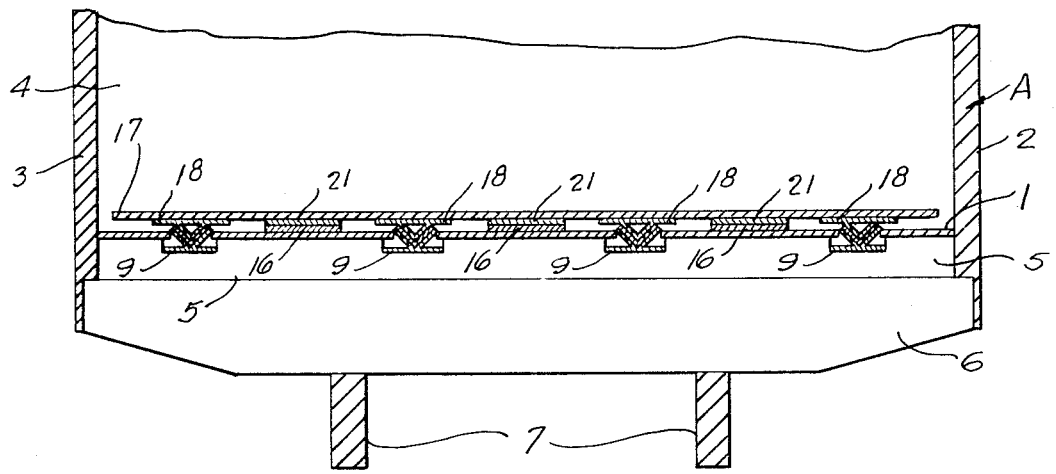
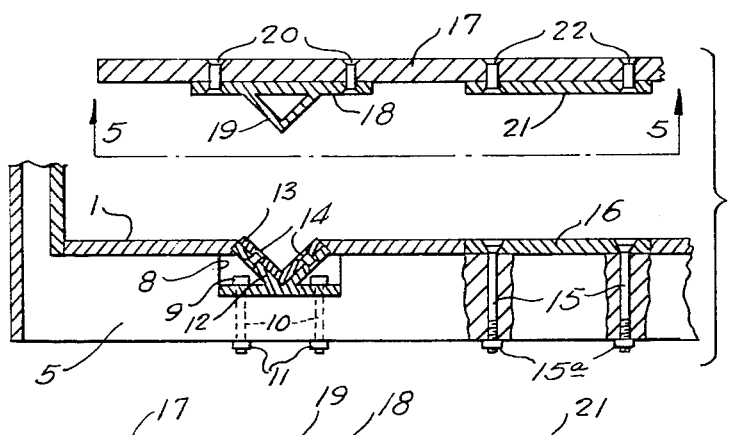
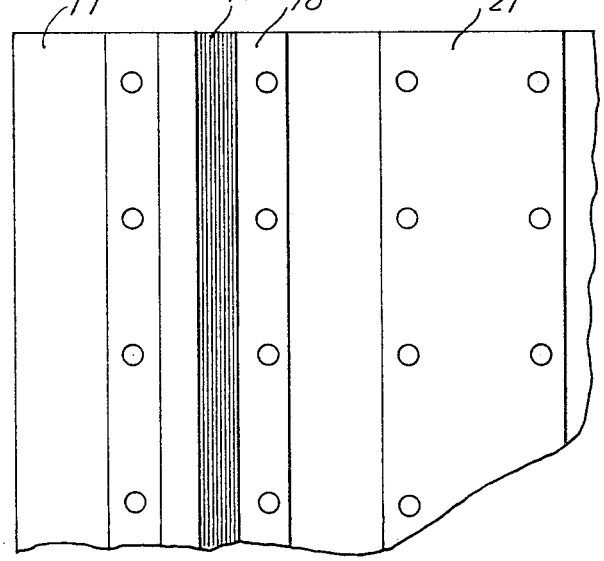

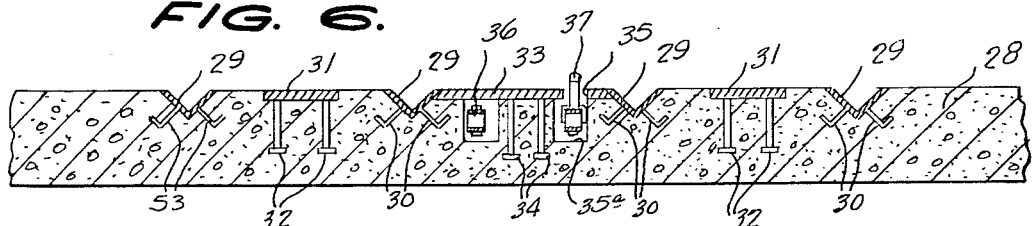
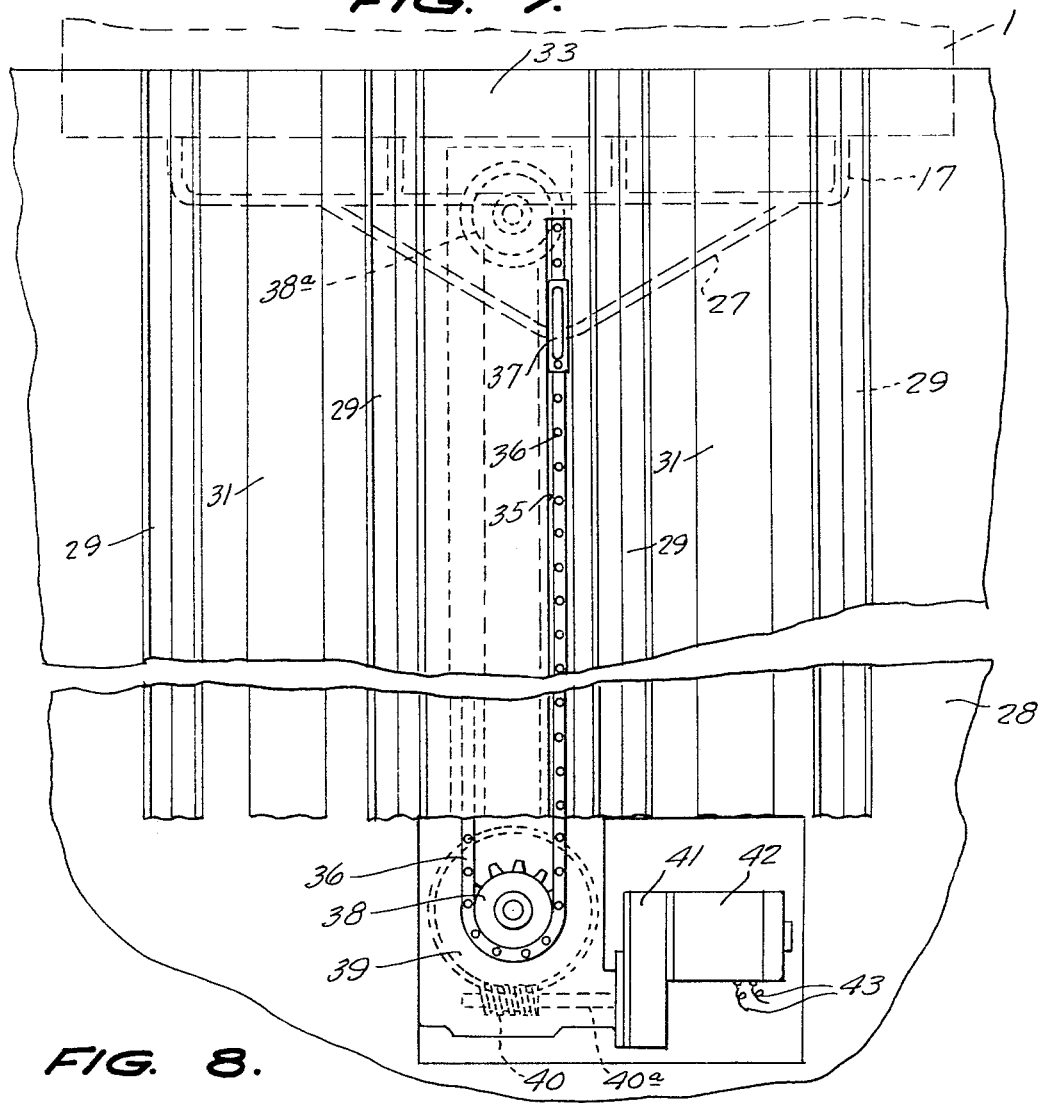
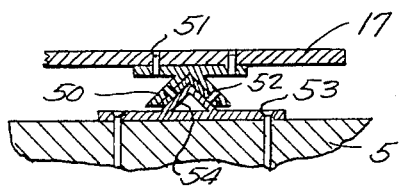
INVENTOR.
LLOYD M. HINCHEE,
BY Linton and Linton
ATTORNEYS.

3,397,802
ARTICLE CONVEYOR SYSTEM
Lloyd M. Hinchee, R.F.D. 2, Roanoke, Va. 24019
Filed Aug. 11, 1965, Ser. No. 478,925
4 Claims. (Cl. 214—38)

ABSTRACT OF THE DISCLOSURE

The present application is concerned with a means for moving articles on to and from trucks into and from a warehouse and employs a V-shaped rail having a V-shaped slide longitudinally slideable thereon and which rails and slides are fixedly mounted on the articles to be moved, the truck and embedded in the warehouse floor whereby the articles can be slid from one position to another.

The principal object of the present invention is to provide tracks to be positioned in vehicles for conveying articles as well as in enclosed areas for storing such articles, such as warehouses, for example, and platforms for supporting the articles slideably positioned upon such tracks whereby the unloading and loading of the articles relative to vehicles therefor and storage areas can be considerably expedited as compared with present apparatus for such purposes at a considerable saving in labor without requiring special skill in the operation thereof.

It is a further important object of the invention to provide a new and novel conveyor for articles particularly including groups of articles or relatively heavy articles between vehicles such as trucks and housing for the articles which will speed up warehouse operation relative to the articles, permit larger amounts of articles to be moved within the same period of time as compared with existing equipment for that purpose, will eliminate expensive equipment normally used for this purpose, will reduce the damage to the articles during the loading and unloading thereof and yet will permit the vehicles for conveying such articles to be used in their conventional and known manner when so desired.

Further objects of the invention will be in part pointed out and in part obvious from the following description of the accompanying drawings in which:

FIG. 1 is a side elevation partly in section of a truck and warehouse including the present invention for loading and unloading articles relative thereto.

FIG. 2 is a longitudinal sectional view taken on line 2—2 of FIG. 1.

FIG. 3 is an enlarged cross sectional view taken on line 3—3 of FIG. 1.

FIG. 4 is a further enlarged cross sectional exploded view of the left hand portion of the truck floor and article support of FIG. 3.

FIG. 5 is a view taken on line 5—5 of FIG. 4.

FIG. 6 is an enlarged cross sectional view of the warehouse floor taken on line 6—6 of FIG. 1.

FIG. 7 is an enlarged plan view of the left hand portion of FIG. 2.

And FIG. 8 is an enlarged cross sectional view of a modified form of track and slide for use with the present apparatus.

Referring now more particularly to the accompanying drawings wherein like and corresponding parts are indicated by similar reference characters a freight trailer is generally indicated by the letter A and such trailer is shown for use with the present invention but only as an example thereof as it is to be appreciated that other types of vehicles for conveying articles can equally as well be used with the present invention. B indicates the truck connected to the trailer by hitch C while D indicates the tandem wheels for supporting the rear of the trailer and E the doors of the trailer. The foregoing are all conventional elements.

Numeral 1 indicates the interior floor of the trailer A while 2 and 3 are the exterior sides thereof and 4 is the front of the trailer. Floor 1 is supported upon a cross beam 5 which in turn is supported by laterally and longitudinally extending beams 6 and 7 respectively, which elements 5, 6, and 7 are normally part of a conventional trailer.

Cross beam 5 has a series of spaced-apart parallel recesses 8 and in each of said recesses is mounted a longitudinally extended plate 9 connected by bolts 10 extending through said beam and retained by nuts 11. Each plate 9 has a longitudinally extending V-shaped support 12 integral therewith. Plates 9 and supports 12 are preferably formed of cast iron or steel.

A V-shaped elongated aluminum rail 13 mates with support 12 and is fastened thereto by rivets 14 flush with the top of floor 1 of the trailer.

Between each pair of rails 13 there is provided an elongated metal plate 16 inserted in floor 1 so that the top of plate 16 is flush with the top of floor 1 and said plates 16 extend longitudinally of said trailer parallel with, but spaced from rails 13. Bolts 15 extend through plates 16 and cross beam 5 for retaining said plates on said cross beam and are held thereto by nuts 15.

A flat article supporting platform of wood, plastic or metal is of a width and length slightly smaller than floor 1 of the trailer. However, platform 17 may be of a plurality of sections with each section slightly smaller than the width of floor 1 and with the combined length of all of said sections being slightly smaller than the length of said floor.

Platform 17 has a series of spaced apart elongated parallel plates 18 held against the bottom face thereof by rivets, bolts or the like 20. Each plate 18 has a V-shaped slide 19 integral therewith and said plates 18 and slides 19 extend the longitudinal length of support 17 and are formed of aluminum.

Between each of the pairs of said plates 18 there is positioned metal plates 21 retained by rivets, bolts or the like 22 to the bottom face of support 17 and plates 21 are equally spaced between their respective pair of plates 18 and also extend the length of support 17.

Slides 19 are positioned on support 17 so that each slide will mate with a rail 13 in floor 1 and likewise plates 21 are positioned on support 17 so that when slides 19 are in rails 13 each plate 21 will be slideably mounted on a plate 16 of floor 1.

Referring to FIG. 1 and 2 truck B has a power driven winch 25 for pulling a cable 26 which extends through the front 4 of said trailer and is fastened to a semi-circular hook 24 fastened to the front end of support 17 for at times pulling support 17 longitudinally of floor 1 until it abuts a bar 23 fixedly mounted on and extending laterally of floor 1 adjacent the front end 4 of said trailer and which bar 23 forms a stop for the movement of support 17 into said trailer.

A second semi-circular hook 27 is fixedly attached to the opposite or rear end of support 17. If support 17 is in a plurality of sections each section has hooks 24 and 27.

The floor 28 of an article receiving area which is indicated as being of concrete but may be of other materials conventionally used for such purposes has as a series of spaced-apart V-shaped aluminum rails embedded in the top of floor 28 with L-shaped anchoring elements 30 also embedded in said floor and connected to said rails. Rails 29 are spaced-apart the same distance as rails 13 of trailer A so that when said trailer is backed up to platform 49 of floor 28 each rail 13 will be exactly in line with a rail 29.

Floor 28 further has a series of plates 31 embedded therein and flush with the top of said floor with anchoring elements 32 extending from each plate 31 likewise embedded in floor 28. Plates 31 are positioned so that each plate 31 will be longitudinally in line with a plate 21 when said trailer A is against platform 49. In lieu of a center plate 31 however floor 28 has a wide metal plate 33 extending between the centermost rails 29 with anchoring elements 34 also embedded in floor 28. Plate 33 has a longitudinally off-set slot 35 opening into one side of an endless elongated recess 35a provided in floor 28 and in which is positioned an endless link belt 36 carrying a pivotal hook 37 extending through slot 35. A pair of sprocket wheels 38 and 38a are rotatably mounted within recess 35a but at opposite ends thereof and with belt 36 extending therearound as shown in FIG. 7. Sprocket wheel 38 is keyed to the same shaft as gear wheel 39 for rotating therewith and said gear wheel meshes with screw gear 40 keyed on a drive shaft 40a extending from a gear box 41 and driven by electric motor 42 to be connected by wires 43 to a source of electrical current.

Floor 28 can extend within a housed area such as a warehouse 44 and has a portion 49 extending therefrom as a loading plaform.

In the ground or road leading up to platform 49 there is embedded a plurality of hydraulic cylinders 45 each having a platform 46 supported on a piston rod 47 in a bore 48 of said cylinder and with each platform 46 being of a width and positioned for receiving one pair of the wheels D of the trailer A. Thus there is a cylinder such as shown in FIG. 1 for each pair of wheels D. Bore 48 is connected at its lower end to a source of air under pressure and controls therefor (not shown) for moving piston rod 47 up and down and thereby through platform 46 raising floor 1 of trailer A until it is flush with floor 28 so that rails 13 and 29 and plates 16 and 31 are flush and contiguous.

When a trailer A is thus positioned relative to platform 49, hook 27 is attached to hook 37 and upon the starting of the motor 42, in one direction, hook 37 will be used to pull support 17 and any articles thereon from the trailer A so that the slides 19 and plates 21 will move along and from rails 13 and plates 16 onto the rails 29 and plates 31 respectively of floor 28 until the support 17 is removed from the trailer A.

Whereas rails 29 and plates 31 are shown in the drawings as only partially extending into warehouse 44 it is to be appreciated that they can extend any distance or into any area of said warehouse and lead to conventional turn tables as well as further rails 29 and plates 31 extending from said turn tables so that the support 17 can be moved into or from any portion of warehouse 44. Belt 36 could likewise extend to any portion of said warehouse or to a limited distance whereupon power means such as a tractor can be attached to hook 27, when disengaged from hook 37, for pulling the support 17 along rails 29 and plates 31 to any position within said warehouse.

A reverse operation can be carried out in that a tractor could be attached to hook 24 of support 17 for pulling the same along floor 28 or hook 24 attached to hook 37 when pivoted whereupon belt 36 would pull said support until the same can be engaged by cable 26 whereupon winch 25 would be used for pulling support 17 onto tracks 13 and plate 16 until stopped by bar 23 loading the trailer A whereupon doors E could be closed and the truck-trailer A–B driven to other areas for being loaded or unloaded in a like manner.

Slides 19 and rails 13 and 29 can be inverted. As shown in FIG. 8 a steel support 51 having a V-shaped section 52 can be fastened to support 17 and having an aluminum rail 50 riveted thereto while aluminum plate 53 can be fixedly mounted on cross bar 5 and flush with floor 1 and has a VV-shaped slide 54 integral therewith for mating with rail 50. Plate 53 could equally as well be embedded in floor 28. Thus rail 50 would slide upon slide 54 in moving the support 17 to and from the trailer and the warehouse with slide 54 being positioned in a like manner to rails 13 and 29.

It has been found that by using slides 19 and rails 13 and 29 or rails 50 and slides 54 of aluminum that the slides and rails will readily slide one upon the other without requiring lubricant therebetween and even with large and heavy loads of articles on support 17.

Also upon removing support 17 from trailer A said trailer can be used in a conventional manner as rails 13 and plates 16 will not interfere with the loading of said trailer or unloading thereof in a conventional manner and in most cases plates 16 and 21 as well as 31 are not required for the present purpose.

The present invention is accordingly capable of considerable modifications and such changes thereto as come within the scope of the appended claims is deemed a part of the present invention.

I claim:

1. In a vehicle having a flat floor and lateral floor supporting members, an article support and conveyor comprising a plurality of elongated metal plates fixedly mounted on said floor supporting members and each plate having a V-shaped section extending from said plate and integral therewith, a plurality of elongated aluminum rails each having a V-cross-sectional configuration and fixedly mounted on one of said metal plates V-section flush with the vehicle floor, flat plates each having a V-section extending therefrom and integral therewith and being composed of aluminum, an article support having a flat side with said second mentioned flat plates being fixedly connected thereto with each section of said second mentioned flat plates positioned for slideably mating with one of said rails.

2. In a vehicle having a flat floor and lateral floor supporting members, an article support and conveyor as claimed in claim 1 wherein a plurality of elongated plates are mounted on said floor supporting members flush with said floor each between a pair of said rails, and a second plurality of elongated plates are fixedly mounted on said article support flat side each between a pair of said second mentioned flat plates and positioned for being mounted on one of said first mentioned plurality of elongated plates.

3. In a vehicle having a flat floor and lateral floor supporting members, an article support and conveyor as claimed in claim 1 wherein fixed means extends laterally of said rails adjacent the inner end of said floor providing a stop for the inward sliding of said article support.

4. A conveyor system for unloading and loading articles between a vehicle and a storage area comprising a plurality of parallel spaced apart aluminum rails embedded in the floors of the vehicle and the storage area, and positioned for being contiguous when the vehicle floor is against the storage area floor, an article support, a plurality of aluminum slides fixedly connected to said article support and positioned thereon whereby each side will slide longitudinally on one of said rails during movement of said article support between and in the vehicle and the storage area and can be detached from said rails, elongated plates fixedly mounted on said article support each between a pair of said slides and positioned thereby for being slideably mounted on one of said first mentioned elongated plates as said article support is moved between said vehicle and said storage area.

References Cited

UNITED STATES PATENTS

| | | | |
|---|---|---|---|
| 1,524,486 | 1/1925 | Marcalos | 308—3 |
| 2,053,969 | 9/1936 | Olds | 214—38 |
| 2,104,299 | 1/1938 | Grundstein | 308—3 |
| 2,126,763 | 8/1938 | Fitch | 214—38 |
| 2,129,340 | 9/1938 | Webber | 214—515 |
| 2,489,869 | 11/1949 | Dunn | 214—38 |
| 2,937,765 | 5/1960 | Shank | 308—3.6 X |
| 3,132,755 | 5/1964 | Greenslate | 214—83.24 |
| 3,162,144 | 12/1964 | Ingold | 104—162 |

ROBERT G. SHERIDAN, *Primary Examiner.*